(12) United States Patent
Uemura et al.

(10) Patent No.: US 8,334,225 B2
(45) Date of Patent: Dec. 18, 2012

(54) STRETCHABLE ARTIFICIAL LEATHER

(75) Inventors: Tomoyuki Uemura, Wako (JP); Atsushi Kakosaka, Wako (JP); Yukito Kaneko, Fukui (JP)

(73) Assignees: Honda Motor Co., Ltd., Tokyo (JP); Seiren Co., Ltd., Fukui-shi (JP)

( * ) Notice: Subject to any disclaimer, the term of this patent is extended or adjusted under 35 U.S.C. 154(b) by 418 days.

(21) Appl. No.: 12/574,831

(22) Filed: Oct. 7, 2009

(65) Prior Publication Data

US 2010/0093243 A1    Apr. 15, 2010

(30) Foreign Application Priority Data

Oct. 8, 2008   (JP) ................... 2008-262093

(51) Int. Cl.
| | |
|---|---|
| *D04B 23/02* | (2006.01) |
| *D04B 21/00* | (2006.01) |
| *D04B 23/00* | (2006.01) |
| *D04B 21/20* | (2006.01) |
| *B32B 5/04* | (2006.01) |
| *B32B 5/22* | (2006.01) |
| *B32B 27/12* | (2006.01) |
| *B32B 5/26* | (2006.01) |

(52) U.S. Cl. ........ 442/304; 442/104; 442/312; 442/318; 442/76; 428/904

(58) Field of Classification Search .......... 442/304–319; 428/904
See application file for complete search history.

(56) References Cited

U.S. PATENT DOCUMENTS

| | | | | |
|---|---|---|---|---|
| 4,122,223 | A * | 10/1978 | Civardi et al. ................ 428/91 |
| 5,518,800 | A * | 5/1996 | Okawa et al. ................ 428/151 |
| 5,707,710 | A * | 1/1998 | Zafiroglu ................ 428/151 |
| 6,660,376 | B1 * | 12/2003 | Zimmel et al. ............ 428/355 N |
| 2004/0237597 | A1 * | 12/2004 | Oya et al. ................ 66/195 |

FOREIGN PATENT DOCUMENTS

| | | |
|---|---|---|
| JP | 63-105191 | 5/1988 |
| JP | 7-197383 | 8/1995 |
| JP | 09-031862 | 2/1997 |
| JP | 09-111671 | 4/1997 |
| JP | 2001-164477 | 6/2001 |

* cited by examiner

*Primary Examiner* — Angela Ortiz
*Assistant Examiner* — Jennifer A Steele
(74) *Attorney, Agent, or Firm* — Jordan and Hamburg LLP

(57) ABSTRACT

Stretchable artificial leather comprising a fibrous substrate comprising tricot knitted fabric, and a polyurethane resin layer laminated on the surface of the fibrous substrate, the stretchable artificial leather having fixed load elongation of from 30 to 60% in each of a longitudinal direction, a lateral direction and a bias direction.

10 Claims, No Drawings

STRETCHABLE ARTIFICIAL LEATHER

CROSS-REFERENCE TO RELATED APPLICATIONS

This application is based upon and claims the benefit of priority from the prior Japanese Patent Application No. 2008-262093, filed on Oct. 8, 2008; the entire contents of which are incorporated herein by reference.

BACKGROUND

The present invention relates to artificial leather useful as automobile interior materials and interior materials such as upholsteries. Particularly, the invention relates to stretchable artificial leather having good visual quality, seam fatigue properties and sitting comfortability even in the case of using the stretchable artificial leather in products having complicated three-dimensional shape.

In general, artificial leather used as automobile interior materials and interior materials such as upholsteries comprises a resin layer and a fibrous substrate. Non-woven fabric and woven fabric are preferably used in the fibrous substrate for the reason that those fabrics have excellent processability and dimensional stability. The non-woven fabric and woven fabric have excellent dimensional stability, but have poor stretchability. Therefore, in the case that those fabrics are used in products having complicated three-dimensional shape, those fabrics had the problem that because of poor follow-up properties to a shape, wrinkles are generated when setting up those fabrics on products, resulting in poor visual quality.

Artificial leather using weft knitted fabric as a fibrous substrate is disclosed to overcome the above problems.

For Example, Japanese Unexamined Patent Publication JP-A 9-31862 (1997) discloses artificial leather comprising weft knitted fabric having a both surface-knitted texture, as a fibrous substrate, and a polyurethane resin skin layer comprising a silicone-modified non-yellowing polycarbonate polyurethane resin, laminated to the surface of the fibrous substrate through a polyurethane resin adhesive layer, the artificial leather having excellent molding processability and shapeability in addition to various properties such as light resistance, hydrolysis resistance, heat deterioration resistance, abrasion resistance and oleic acid resistance. JP-A 9-111671 (1997) discloses artificial leather comprising a base fabric having laminated on the surface thereof a urethane adhesive layer and a polyurethane skin layer in this order, wherein the base fabric is a knit fabric having raising on the surface thereof and is a knit fabric having been subjected to specific knitting through a spun yarn as a weft in a course direction of the knit fabric, the base fabric has an elongation of from 60 to 100% in longitudinal and lateral directions, and 20 to 99% of the length of the raising fiber are present in the adhesive layer. The artificial leather is free of fraying and has excellent durability, tear strength, feeling and processability along design. JP-A 2001-164477 discloses artificial leather comprising a raised circular knit fabric having laminated on a raised face side thereof a polyurethane adhesive layer and a polyurethane skin layer in this order, wherein the raised circular knit fabric comprises a ground yarn and a raised yarn, each comprising a polyester multifilament, a ratio of the fed length of the ground yarn and that of the raised yarn is from 1:1.1 to 1:1.3, and a ratio of the number of knitted loops of the ground yarn and that of the raised yarn is 1:1. The artificial leather has excellent stretchability, feeling, peel strength and tear strength.

However, in the case of using the weft knitted fabric as a fibrous substrate as disclosed in the above documents, stretchability is improved as compared with non-woven fabric and woven fabric, but knitted loop is easily opened in the weft knitted fabric. As a result, in the case of using the weft knitted fabric in products having complicated three-dimensional shape, there is the problem that pinholes are highly visible when setting up, resulting in deterioration of visual quality, and there is also the problem that durability, particularly seam fatigue properties, is poor.

SUMMARY

An object of the present invention is to provide stretchable artificial leather having good visual quality, seam fatigue properties and setting comfortability even in the case of using the stretchable artificial leather in products having complicated three-dimensional shape in automobile interior materials and interior materials such as upholsteries.

The stretchable artificial leather according to an aspect of the present invention is artificial leather comprising a fibrous substrate comprising tricot knitted fabric and a polyurethane resin layer laminated on the surface of the fibrous substrate, the stretchable artificial leather having fixed load elongation of from 30 to 60% in each of a longitudinal direction, a lateral direction and a bias direction.

According to the aspect of the present invention, the stretchable artificial leather comprises a fibrous substrate comprising tricot knitted fabric, and a polyurethane resin layer laminated on the surface of the fibrous substrate, and the fixed load elongation of the stretchable artificial leather is limited to 30 to 60% in each of a longitudinal direction, a lateral direction and a bias direction. Therefore, even in the case of using the stretchable artificial leather in products having complicated three-dimensional shape, wrinkles are difficult to be generated and pinholes are difficult to be visible when setting up the stretchable artificial leather to the products, that is, visual quality is good. Additionally, seam fatigue properties and sitting comfortability are good.

DETAILED DESCRIPTION

The stretchable artificial leather according to the embodiment of the present invention is described in detail below.

The stretchable artificial leather according to the present embodiment comprises a fibrous substrate comprising tricot knitted fabric, and a polyurethane resin layer laminated on the surface of the fibrous substrate, the stretchable artificial leather having fixed load elongation of from 30 to 60%, and preferably from 40 to 50%, in each of a longitudinal direction, a lateral direction and a bias direction. In the present description, the longitudinal direction and the lateral direction of the artificial leather are the same as the longitudinal direction and the lateral direction of the tricot knitted fabric as the fibrous substrate. The bias direction is a direction intersecting with the longitudinal direction and the lateral direction at an angle of 45°.

Due to the requirement that the stretchable artificial leather has fixed load elongation of from 30 to 60% in each of a longitudinal direction, a lateral direction and a bias direction, the stretchable artificial leather has good elongation balance. Therefore, even in the case that the stretchable artificial leather is used in products having complicated three-dimensional shape, a stretchable artificial leather in which wrinkles are difficult to be generated and pinholes are difficult to be visible when setting up the stretchable artificial leather to the products, that is, visual quality is good, can be achieved.

Furthermore, in the case that the stretchable artificial leather is used in, for example, car seats and upholsteries, buttocks uniformly sink down at sitting, and sitting comfortability is good, since the stretchable artificial leather has good elongation balance. In the case that the fixed load elongation in at least one direction is less than 30%, wrinkles are easily generated when setting up the stretchable artificial leather to products, resulting in deterioration of visual quality, and sitting comfortability becomes impaired. In the case that the fixed load elongation in at least one direction, particularly a lateral direction, exceeds 60%, pinholes are easily visible when setting up the stretchable artificial leather to products, resulting in deterioration of visual quality, and sitting conformability becomes impaired.

The stretchable artificial leather according to the present embodiment has a BLC value of preferably from 3.0 to 6.5, and particularly preferably from 4.0 to 6.0. The BLC value is an index of feeling characteristics by the touch to leather. When the BLC value is fallen within the above range, the stretchable artificial leather feels soft. For example, in the case of using the stretchable artificial leather in car seats and upholsteries, sitting comfortability becomes better. In the case that the BLC value is less than 3.0, feeling may be coarse and hard. In the case that the BLC value exceeds 6.5, abrasion resistance may be deteriorated.

The BLC value used herein means a value calculated using ST300 Leather Softness Tester (manufactured by BLC Leather Technology Center Ltd.).

The stretchable artificial leather according to the present embodiment has peel strength of preferably 0.5 kg/cm or more, and particularly preferably 1.0 kg/cm or more. In the case that the peel strength is less than 0.5 kg/cm, adhesiveness between the fibrous substrate and the polyurethane resin layer of the stretchable artificial leather obtained may be deteriorated, and as a result, seam fatigue properties and abrasion resistance may be deteriorated. The upper limit of the peel strength is not particularly limited, and may be, for example, 5 kg/cm or less.

It is important that the fibrous substrate used in the stretchable artificial leather according to the present embodiment comprises tricot knitted fabric. The tricot knitted fabric is dense as compared with weft knitted fabric. Therefore, wrinkles are difficult to be generated and pinholes are difficult to be visible when setting up the stretchable artificial leather to products, that is, visual quality is good. Additionally, seam fatigue properties are good. Furthermore, elongation balance in a longitudinal direction, a lateral direction and a bias direction is easy to control as compared with the weft knitted fabric, and as a result, stretchable artificial leather having good sitting comfortability can be achieved.

The fibrous substrate has fixed load elongation of preferably from 40 to 70%, and particularly preferably from 50 to 60%, in each of a longitudinal direction, a lateral direction and a bias direction. When the fixed load elongation of the fibrous substrate is fallen within the above range, the stretchable artificial leather obtained can have the fixed load elongation in a desired range. In the case that the fixed load elongation in at least one direction is less than 40%, the stretchable artificial leather obtained may easily generate wrinkles when setting up the stretchable artificial leather to products, and visual quality may be deteriorated. In the case that the fixed load elongation in at least one direction, particularly, a lateral direction, exceeds 70%, pinholes may be easily visible when setting up the stretchable artificial leather obtained to products, and visual quality may be deteriorated.

Kind of the fiber used in the fibrous substrate is not particularly limited. Examples of the fiber that can be used include conventional fibers such as natural fibers, regenerated fibers, semisynthetic fibers, and synthetic fibers. Those fibers may be used as mixtures of two or more thereof. Furthermore, the fibrous substrate which is coated with or dipped in the conventional solvent-type or aqueous polymer compounds such as a polyurethane resin or its copolymer, followed by dry coagulation or wet coagulation can be used. Of those, synthetic fibers, particularly polyester fibers, are preferably used from the points of strength and processability.

Shape of the fibers used in the fibrous substrate is not particularly limited, and any of filament fibers and staple fibers can be used. Furthermore, cross-sectional shape of the fiber is not particularly limited. The fiber can have a cross-sectional shape of not only the ordinary round shape, but irregular shape such as flat shape, triangular shape, hollow shape, Y shape, T shape and U shape.

Form of a yarns used in the fibrous substrate is not particularly limited. Any of filament yarns (formed of filament fibers) and spun yarns (formed of staple fibers) can be used. Furthermore, mixed spun yarn obtained by combining filament fibers and staple fibers can be used. If required and necessary, the filament yarn may be twisted, and stretchability and bulk properties may be imparted to the filament yarn by false twisting processing, fluid confusion treatment or the like.

The yarns used in the fibrous substrate have fineness of preferably from 30 to 300 dtex, and particularly preferably from 50 to 200 dtex. In the case that the fineness is less than 30 dtex, strength of the stretchable artificial leather obtained may be deteriorated. In the case that the fineness exceeds 300 dtex, elongation balance of the fibrous substrate may be difficult to control, and feeling of the fibrous substrate may be coarse and hard. Consequently, elongation balance and feeling of the stretchable artificial leather obtained, and sitting comfortability may be deteriorated.

Single fiber fineness of the yarns used in the fibrous substrate is preferably 2.2 dtex or less, and particularly preferably 1.1 dtex or less, from the standpoint of improvement in adhesiveness between the fibrous substrate and the polyurethane resin layer. In the case that the single fiber fineness exceeds 2.2 dtex, peel strength of the stretchable artificial leather obtained may be deteriorated, resulting in deterioration of abrasion resistance. The lower limit of the single fiber fineness is not particularly limited, and may be, for example, 0.1 dtex or more.

The tricot knitted fabric as the fibrous substrate of the present embodiment is preferably multi-layer (multi-guide bar) knitted fabric texture obtained by knitting with a tricot knitting machine using plural guide bars, and is particularly preferably doubly or triply knitted texture using 2 or 3 guide bars. When the tricot knitted fabric has the multi-knitted texture, a stretchable artificial leather having strength suitable for use in automobile interior materials and interior materials such as upholsteries is obtained.

Multi-layer knitted texture of the tricot knitted fabric preferably employs denbigh texture and/or 2 to 6-needle swing cord texture. Each multi-layer knitted texture may be a combination of the same textures or a combination of different textures, and can appropriately be selected according to the purpose. Above all, a multi-layer knitted texture obtained by combining denbigh texture and cord texture is preferred. When the above knitted texture is used, the tricot knitted fabric has good stretchability in a longitudinal direction, and consequently, the stretchable artificial leather obtained has good stretchability in a longitudinal direction.

The tricot knitted fabric is preferably subjected to so-called width shortening in a heat treatment step such as that using a heat setter, thereby making wale density of the tricot knitted fabric after the heat treatment be larger than that just after the knitting (in a state of so-called "greige") of the tricot knitted fabric. A ratio of the wale density of the tricot knitted fabric after the heat treatment to that just after the knitting, or a ratio of increasing of the wale density by width shortening, is arbitrarily and appropriately set so that: the wale density is increased to a certain extent; and thereby, "knitted loop density" of the tricot fabric after the heat treatment is fallen within a range, which will be described below. The ratio of increasing of the wale density is preferably from 1.1 to 3.0, more preferably from 1.3 to 2.0, and further preferably from 1.40 to 1.75. When the ratio of increasing of the wale density is fallen within a range of from 1.1 to 3.0, stretchability in a lateral direction of the tricot knitted fabric becomes good, and consequently, stretchability in a lateral direction of the stretchable artificial leather obtained becomes good. In the case that the ratio of increasing of the wale density is less than 1.1, stretchability in a lateral direction of the tricot knitted fabric may be deteriorated, and consequently, stretchability in a lateral direction of the stretchable artificial leather obtained may be deteriorated. In the case that the ratio of increasing of the wale density exceeds 3.0, elongation balance of the tricot knitted fabric may be difficult to control. As a result, elongation balance of the stretchable artificial leather obtained may be deteriorated, and sitting comfortability may be deteriorated. The wale density used herein means the number of knitted loops per 1 inch (2.54 cm) in a lateral direction of the tricot knitted fabric. The course density used herein means the number of knitted loops per 1 inch (2.54 cm) in a longitudinal direction of the tricot knitted fabric.

Knitted loop density (number of knitted loops per unit area) of the tricot knitted fabric is preferably from 1,000 to 5,000/(2.54 cm)$^2$, more preferably from 2,000 to 4,000/(2.54 cm)$^2$, and particularly preferably from 2,500 to 3,500/(2.54 cm)$^2$. In the case that the knitted loop density is less than 1,000/(2.54 cm)$^2$, knitted loop may be easy to open. As a result, pinholes may be easy to be visible when setting up, visual quality may be deteriorated, and seam fatigue properties of the stretchable artificial leather obtained may be deteriorated. In the case that the knitted loop density exceeds 5,000/(2.54 cm)$^2$, elongation balance of the tricot knitted fabric may be difficult to control, and feeling may be become coarse and hard. Consequently, elongation balance and feeling of the stretchable artificial leather obtained, and sitting comfortability may be deteriorated. The knitted loop density used herein is obtained by multiplying wale density by course density.

Ratio between course density and wale density (course density/wale density) of the tricot knitted fabric is preferably from 1.0 to 2.0, and more preferably from 1.4 to 1.7, in that balance of fixed load elongation becomes good. In the case that the ratio exceeds 2.0, fixed load elongation in a longitudinal direction to fixed load elongation in a lateral direction may be too large. On the other hand, in the case that the ratio is less than 1.0, fixed load elongation in a lateral direction to fixed load elongation in a longitudinal direction may be too large.

When the fibrous substrate comprising the tricot knitted fabric is satisfied with the above requirements, a fibrous substrate having good elongation balance in a longitudinal direction, a lateral direction and a bias direction is obtained, and consequently, a stretchable artificial leather having good elongation balance in a longitudinal direction, a lateral direction and a bias direction is obtained.

The fibrous substrate has basis weight (weight per unit area) of preferably from 100 to 400 g/m$^2$, and particularly preferably from 150 to 250 g/m$^2$. In the case that the basis weight is less than 100 g/m$^2$, strength and seam fatigue properties of the stretchable artificial leather may be deteriorated. In the case that the basis weight exceeds 400 g/m$^2$, the BLC value of the stretchable artificial leather may be decreased, and feeling and sitting comfortability may be deteriorated.

Weight ratio between the fibrous substrate and the polyurethane resin layer described hereinafter is that the weight of the polyurethane resin layer is preferably from 0.375 to 3.0 times, and particularly preferably from 0.6 to 1.7 times, the weight of the fibrous substrate. When the weight ratio is fallen within the above range, the stretchable artificial leather obtained has the desired BLC value, and stretchable artificial leather having good feeling and sitting comfortability is obtained. In the case that the weight of the polyurethane resin layer is less than 0.375 times the weight of the fibrous substrate, strength and seam fatigue properties of the artificial leather obtained may be deteriorated. In the case that the weight of the polyurethane resin layer exceeds 3.0 times the weight of the fibrous substrate, the BLC value of the stretchable artificial leather may be decreased, and feeling and sitting comfortability may be deteriorated.

The stretchable artificial leather according to the present embodiment comprises; the fibrous substrate comprising the tricot knit fabric; and the polyurethane resin layer overlaid on either of front and rear faces of the fibrous substrate. In this case, the face of the tricot knitted fabric on which the polyurethane resin layer is overlaid, is not particularly limited to either of the faces so long as the fixed load elongation of the artificial leather thus obtained is from 30 to 60% either in a longitudinal direction, a lateral direction and a bias direction; and can appropriately be selected according to the purpose. For example, when higher stretchability is required, the polyurethane resin layer is preferably overlaid on the face having a knitting pattern that has larger yarn swing, among the front and rear faces of the tricot knit fabric. The reason for this is that the polyurethane resin applied on such face is relatively difficult to permeate into inside of the tricot knitted fabric so that knitted loops of the tricot knitted fabric are difficult to be restrained. As an example, in the case of a tricot knitted fabric obtained by combining knit layers of denbigh texture and cord texture, the polyurethane resin layer is overlaid on the face of the cord texture.

On the other hand, when higher durability in respect of seam fatigue properties and abrasion resistance is required, the polyurethane resin layer is preferably overlaid on the face having a knitting pattern that has smaller yarn swing. The reason for this is that because the face of smaller yarn swing has a higher density of the knitted loops or the knitted yarns, the polyurethane resin is more uniformly applied to the surface, and adhesiveness between the tricot knitted fabric and the polyurethane resin layer is increased. As an example, in the case of a tricot knitted fabric obtained by combining knit layers of denbigh texture and cord texture, the polyurethane resin layer is overlaid on the face of the denbigh texture.

The polyurethane resin layer of the stretchable artificial leather according to the present embodiment can use the same polyurethane resin layer as the polyurethane resin layer used in the conventional artificial leather. Kind of the polyurethane resin and layer structure are not particularly limited. However, the layer structure is preferably a multilayered structure comprising a fibrous substrate having laminated on the surface thereof a porous layer as a first resin layer, and a non-porous layer as a second resin layer, in this order. When the polyurethane resin layer has the multilayered structure, the stretchable artificial leather obtained has good feeling and durability.

Examples of the polyurethane resins that may be used in the porous layer of the polyurethane resin layer include polyether type polyurethane resins, polyester type polyurethane resins and polycarbonate type polyurethane resins. Either of those resins can be used alone or as mixtures of two or more thereof. Of those, polycarbonate type polyurethane resins are preferred from the points of flame retardancy, durability and light resistance. Form of the polyurethane resin is not limited, and any polyurethane resins can be used, regardless of a non-solvent type (solventless type), a hot-melt type, a solvent type and an aqueous type, and regardless of one-component type, two-component curing type and moisture-curable type. The polyurethane resin can appropriately be selected according to the purpose and the use. Above all, a moisture-curable polyurethane resin is preferably used from the standpoints that environmental load is small and porous layer can be formed without separate step and additives.

The moisture-curable polyurethane resin is preferably a polyurethane resin obtained by the reaction of a hot-melt urethane prepolymer having isocyanate groups at the molecular terminals (hereinafter referred to as a "hot-melt urethane polyisocyanate prepolymer", or simply a "prepolymer") and water in the atmosphere (moisture).

The polyurethane resin is a general name of a polymer compound having a urethane bond (—NHCOO—) as conventionally known, and is generally obtained by reacting (crosslinking/curing reaction) a polyol and a polyisocyanate (see the formula (I) shown below). A urethane prepolymer is obtained by stopping the reaction between a polyol and a polyisocyanate at an appropriate stage, and is characterized by completion of a curing reaction at the time of use. The polyisocyanate prepolymer has isocyanate groups at the molecular terminals. The isocyanate group reacts with water in the atmosphere to form amine and carbon dioxide gas (see formula (II) shown below), and the isocyanate group further reacts with a reaction product in a form of a chain reaction (see the formulae (III) and (IV) shown below). Thus, a polyurethane resin layer having a three-dimensional network structure is formed, and at the same time, many pores are formed in the resin layer by carbon dioxide gas evolved in the formula (II).

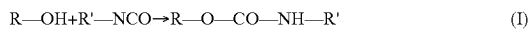

(I)

(II)

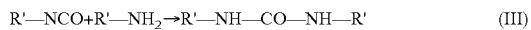

(III)

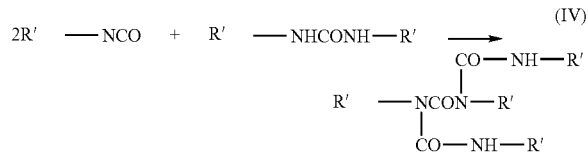

(IV)

Hot-melt properties possessed by the urethane prepolymer are properties attributable to a molecular structure, and mean properties that the prepolymer is solid or is in a viscous state to an extent such that the prepolymer is difficult to apply to a substrate, at ordinary temperature, but when heat is applied to the prepolymer, the prepolymer melts and converts into a liquid and cohesive force is again developed by cooling. When the urethane prepolymer having the properties is used, the urethane prepolymer can be applied to a substrate in a heat-melted state. As a result, an organic solvent adversely affecting environment and human body is not required to use. Furthermore, a step of removing an organic solvent is not necessary in the production process, and energy load and production cost can be reduced.

The hot-melt urethane polyisocyanate prepolymer can be obtained by reacting a polyol and a polyisocyanate under the condition that isocyanate groups present in the polyisocyanate are excess to hydroxyl groups present in the polyol.

The polyol that can be used in producing the hot-melt urethane polyisocyanate prepolymer is not particularly limited, and examples thereof include polyester polyol, polyether polyol, polycarbonate polyol, acryl polyol, polyolefin polyol, castor oil polyol and silicone-modified polyol. Those can be used alone or as mixtures of two or more thereof. Of those, polyether polyol and polycarbonate polyol are preferred from the points of stretchability and hydrolysis resistance, and polycarbonate polyol is more preferred from the points of light resistance and heat resistance.

On the other hand, the polyisocyanate that can be used in producing the hot-melt urethane polyisocyanate prepolymer is not particularly limited, and examples thereof include aromatic diisocyanates such as phenylene diisocyanate, tolylene diisocyanate (TDI), 4,4'-diphenylmethane diisocyanate (MDI), 2,4'-diphenylmethane diisocyanate, naphthalene diisocyanate and xylylene diisocyanate; aliphatic diisocyanates or alicyclic diisocyanates, such as hexamethylene diisocyanate, lysine diisocyanate, cyclohexane diisocyanate, isophorone diisocyanate, dicyclohexylmethane diisocyanate and tetramethylxylylene diisocyanate; and polymeric MDI containing a dimer or a trimer of 4,4'-diphenylmethane diisocyanate (MDI). Of those, 4,4'-diphenylmethane diisocyanate (MDI) is preferred from the point of easy control of a curing reaction.

An equivalent ratio of isocyanate group/hydroxyl group in reacting the polyol and the polyisocyanate is preferably from 1.1 to 5.0, and more preferably from 1.5 to 3.0. In the case that the equivalent ratio is less than 1.1, hydroxyl groups may remain in the prepolymer, hydrolysis may be easy to occur in a polyurethane resin obtained by curing, and properties of the polyurethane resin may be poor. In the case that the equivalent ratio exceeds 5.0, stability may be deteriorated, and it may be impossible to control a curing reaction.

Production of the hot-melt urethane polyisocyanate prepolymer can use the conventional various methods, and is not particularly limited. For example, a method of mixing water-removed polyol and polyisocyanate at a given proportion, heating the resulting mixture and then reacting the mixture in a batchwise system, and a method of heating water-removed polyol and polyisocyanate, respectively, introducing those into an extruder in a given ratio, and reacting those in a continuous extrusion reaction system can be used.

The hot-melt urethane polyisocyanate prepolymer thus obtained has a softening temperature of preferably from 30 to 100° C., and more preferably from 40 to 70° C. In the case that the softening temperature is less than 30° C., the polyurethane resin obtained by curing may have low softening temperature, and may have poor heat resistance and strength. In the case that the softening temperature exceeds 100° C., high temperature may be required to obtain a viscosity suitable for processing, and workability may be deteriorated.

If required and necessary, the hot-melt urethane polyisocyanate prepolymer may contain optional components such as urethane hardeners (urethane curing agent), urethanation catalysts, crosslinking agents, silane coupling agents, fillers, thixotropy-imparting agents, tackifiers, waxes, heat stabilizers, light stabilizers, fluorescent brighteners, foaming agents, thermoplastic resins, thermosetting resins, dyes, pigments, flame retardants, conductivity-imparting agents, antistatic agents, moisture permeability improvers, water repellents, oil repellents, hollow foams, crystallization water-containing compounds, water absorbents, moisture absorbents, deodorants, foam-controlling agents, defoamers, fungicides, preservatives, algaecides, pigment dispersants, inert gases, antiblocking agents and hydrolysis inhibitors, in a range that properties of the polyurethane resin obtained by curing are not impaired. Those optional components can be used alone or as mixtures of two or more thereof. Above all, urethane hardeners and urethanation catalysts are preferably used to reduce process load and improve properties of artificial leather.

The polyurethane resin obtained by curing the hot-melt urethane polyisocyanate prepolymer has a softening temperature of preferably from 130 to 240° C., and more preferably from 140 to 200° C. In the case that the softening temperature is less than 130° C., heat resistance may be poor. In the case that the softening temperature exceeds 240° C., feeling of artificial leather may be coarse and hard.

A porous layer comprising the moisture-curable polyurethane resin has a thickness of preferably from 60 to 350 μm, and preferably from 100 to 200 μm. In the case that the thickness is less than 60 μm, abrasion resistance may be poor. In the case that the thickness exceeds 350 μm, the BLC value of the stretchable artificial leather may be decreased, and feeling and sitting comfortability may be deteriorated.

The stretchable artificial leather of the present embodiment preferably comprises a fibrous substrate, a porous layer as a first resin layer laminated on the surface of the fibrous substrate, and a non-porous layer comprising a polyurethane resin as a second resin layer laminated on the surface of the porous layer. This structure improves abrasion resistance of the stretchable artificial leather. The non-porous layer means a general name of a resin layer formed on the surface of the porous layer, and comprises at least one layer of the resin layer. However, the non-porous layer can comprise at least two resin layers having the same or different composition.

The polyurethane resins that may be used in the formation of the non-porous layer are not particularly limited, and examples thereof include polyether type polyurethane resins, polyester type polyurethane resins and polycarbonate type polyurethane resins. Either of those resins can be used alone or as mixtures of two or more thereof. Of those, polycarbonate type polyurethane resins are preferably used from the points of flame retardancy, durability and light stability. Form of the polyurethane resin is not limited, and any polyurethane resins can be used, regardless of a non-solvent type (solventless type), a hot-melt type, a solvent type and an aqueous type, and regardless of one-component type, two-component curing type and moisture-curable type. The polyurethane resin is appropriately selected according to the object and the use.

If required and necessary, the polyurethane resin may contain optional components such as urethane hardeners (urethane curing agents), urethanation catalysts, crosslinking agents, silane coupling agents, fillers, thixotropy-imparting agents, tackifiers, waxes, heat stabilizers, light stabilizers, fluorescent brighteners, thermoplastic resins, thermosetting resins, dyes, pigments, flame retardants, conductivity-imparting agents, antistatic agents, moisture permeability improvers, water repellents, oil repellents, hollow foams, crystallization water-containing compounds, water absorbents, moisture absorbents, deodorants, foam-controlling agents, defoamers, fungicides, preservatives, algaecides, pigment dispersants, inert gases, antiblocking agents and hydrolysis inhibitors, in a range that properties of the polyurethane resin are not impaired. Those optional components can be use alone or as mixtures of two or more thereof.

The non-porous layer has a thickness of preferably from 10 to 100 μm, and more preferably from 20 to 50 μm. In the case that the thickness is less than 10 μm, it may be difficult to uniformly form the non-porous layer, and the non-porous layer may partially lack. In the case that the thickness exceeds 100 μm, the BLC value of the stretchable artificial leather may be decreased, and feeling and sitting comfortability may be deteriorated.

The polyurethane resin layer comprising a combination of the first resin layer and the second resin layer has dry application amount (dry weight per unit area) of preferably from 150 to 300 g/m$^2$, and more preferably from 200 to 250 g/m$^2$. In the case that the dry application amount is less than 150 g/m$^2$, seam fatigue properties and abrasion resistance may be deteriorated. In the case that the dry application amount exceeds 300 g/m$^2$, the BLC value of the stretchable artificial leather may be decreased, and feeling and sitting comfortability may be deteriorated.

The polyurethane resin layer alone has tensile elongation at break of preferably 90% or more, and particularly preferably 100% or more. In the case that the tensile elongation at break is less than 90%, the stretchable artificial leather obtained may have poor stretchability. As a result, wrinkles may be generated and pinholes may be visible when setting up, resulting in deterioration of visual quality. The upper limit of the tensile elongation at break is not particularly limited, and may be, for example, 200% or less.

The polyurethane resin layer alone has tensile strength at break of preferably 0.5 MPa or more, and particularly preferably 1.0 MPa or more. In the case that the tensile strength at break is less than 0.5 MPa, seam fatigue properties of the stretchable artificial leather obtained may be deteriorated. The upper limit of the tensile strength at break is not particularly limited, and may be, for example, 20 MPa or less.

The production method of artificial leather is described below by reference to the particularly preferred embodiment in the stretchable artificial leather according to the practical embodiment. However, the production method of the artificial leather of the present invention is not particularly limited, and the following methods are exemplified.

(1) A composition containing a hot-melt urethane polyisocyanate prepolymer in a heat-melted state (hereinafter, this may be referred to as "prepolymer composition") is applied to a releasable substrate, then the releasable substrate is bonded by a surface coated with the prepolymer composition, to the fibrous substrate at a time the prepolymer composition still retains a viscose state; and subsequently the laminate is cooled to room temperature and then subjected to aging treatment. Thus, a porous layer is formed. Then, the releasable substrate is removed and separated, and a composition containing a polyurethane resin (hereinafter, this may be referred to as "polyurethane resin composition") is applied to an outer or exposed surface of the porous layer. This procedure is followed by heat treatment and aging treatment as needed. Thus, a non-porous layer is formed.

(2) A composition containing a hot-melt urethane polyisocyanate prepolymer in a heat-melted state is applied to a fibrous substrate, then the fibrous substrate is bonded by a surface coated with the prepolymer composition, to a releasable substrate at a time the prepolymer composition still retains a viscose state, and the laminate is cooled to room temperature and then subjected to aging treatment. Thus, a porous layer is formed. Then, the releasable substrate is removed, a composition containing a polyurethane resin is applied to the exposed surface of the porous layer. This procedure is followed by heat treatment and aging treatment as needed. Thus, a non-porous layer is formed.

(3) A composition containing a polyurethane resin is applied to a releasable substrate. This procedure is followed by heat treatment and aging treatment as needed. Thus, a non-porous layer is formed. A composition containing a hot-melt urethane polyisocyanate prepolymer in a heat-melted state is applied to an outer surface of the non-porous layer, then the releasable substrate is bonded by a surface coated with the prepolymer composition, to a fibrous substrate at a time the prepolymer composition still retains a viscose state, and the laminate is cooled to room temperature and then subjected to aging treatment. Thus, a porous layer is formed. Finally, the releasable substrate is removed.

Of the above methods, the method (3) is preferably used for the reasons that thickness of the non-porous layer can easily be controlled and a uniform layer can be formed. The production method of the artificial leather is described below by reference to the method (3), but various items such as an application method of a resin and a heat treatment are basically the common items even in the case of using the methods (1) and (2).

A method for applying the polyurethane resin composition to the releasable substrate can use the conventional various methods, and is not particularly limited. For example, methods using apparatuses such as reverse roll coater, spray coater, roll coater, gravure coater, kiss roll coater, knife coater, comma coater and T-die coater can be used. Of those, application by knife coater or comma coater is preferably used in the point that a uniform thin film can be formed.

The releasable substrate is not particularly limited, and may be a film by itself formed of either of resins releasable from a polyurethane resin material, which are for example, olefin resin, silicone resin, fluorine resin and the like and hereinafter referred to as "release agent". In otherwise, the releasable substrate may be a laminate sheet having a layer of the release agent and a substrate formed of a paper sheet, a fabric sheet or a resin film or the like; and namely be a release paper, a release fabric, a release film or the like. The releasable substrate may have concave-convex patterns, in a manner that an ornamental pattern is imparted to the surface of artificial leather.

Application thickness of the polyurethane resin composition is appropriately determined according to the thickness of the non-porous layer.

If required and necessary, heat treatment may be conducted. The heat treatment is conducted to evaporate a solvent in the polyurethane resin composition and dry a resin, and additionally to promote a reaction and to form a coating film having sufficient strength in the case of using a crosslinking agent causing a crosslinking reaction by heat treatment and in the case of using a two-component curing resin. The heat treatment temperature is preferably from 50 to 150° C., and more preferably from 60 to 120° C. In the case that the heat treatment temperature is less than 50° C., the heat treatment may require much time, process load may be increased, and crosslinking of a resin may be insufficient. As a result, abrasion resistance may be poor. In the case that the heat treatment temperature exceeds 150° C., feeling of artificial leather may be coarse and hard. The heat treatment time is preferably from 2 to 20 minutes, and more preferably from 3 to 10 minutes. In the case that the heat treatment time is less than 2 minutes, crosslinking of a resin may be insufficient, and abrasion resistance may be poor. In the case that the heat treatment time exceeds 20 minutes, processing rate may be decreased, and process load may be increased.

In the case of using a hot-melt type resin as the polyurethane resin, a non-porous layer can be formed by applying a heat-melted resin to the surface of the porous layer and then cooling the resin. Therefore, heat treatment is not necessary.

If required and necessary, an aging treatment is conducted to complete the reaction. Thus, a non-porous layer is formed on the releasable substrate.

A method for applying the hot-melt urethane polyisocyanate prepolymer composition on the surface of the non-porous layer formed on the releasable substrate can use the conventional various methods, and is not particularly limited. Examples of the method include methods using apparatuses such as spray coater, roll coater, knife coater, comma coater and T-die coater. Of those, application with knife coater or comma coater is preferred from the point that a uniform thin film layer can be formed. The prepolymer is heat-melted in a raw material tank capable of controlling a temperature so as to be fluidized, the melt is mixed with other raw materials in a given proportion with a mixing head, the resulting mixture is stirred, and the mixture is fed to a coating apparatus.

Heat-melting temperature of the hot-melt urethane polyisocyanate prepolymer is set to a temperature preferably 20 to 80° C. higher, and more preferably 40 to 60° C. higher, than the softening temperature thereof. In the case that the heat-melting temperature is a temperature less than 20° C. higher than the softening temperature of the prepolymer, viscosity of the prepolymer may be high, and workability at the application may become bad. In the case that the heat-melting temperature is a temperature more than 80° C. higher than the softening temperature of the prepolymer, it may be impossible to control a curing reaction. The heat-melting temperature is set to a range of generally from 50 to 150° C., and preferably from 60 to 120° C.

The prepolymer composition has an application thickness of preferably from 50 to 300 μm, and more preferably from 100 to 200 μm. In the case that the application thickness is set to this range, a porous layer having a thickness preferably 1.1 to 2 times, and more preferably from 1.2 to 1.5 times, the application thickness can be obtained. Consequently, a porous layer having a thickness of preferably from 60 to 350 μm, and more preferably from 100 to 200 μm, is obtained.

The porous layer is bonded to the fibrous substrate in a state that the prepolymer composition (a part thereof undergoes a curing reaction, thereby converting into polyurethane) has viscosity. The laminate is cooled to room temperature, and then subjected to aging treatment. Thus, a porous layer is formed.

Reaction rate of the hot-melt urethane polyisocyanate polymer greatly varies depending on kind and amount of the prepolymer selected and additives (particularly, urethane hardener and urethanation catalyst) optionally used. Therefore, it is necessary to appropriately set the aging treatment conditions depending on the conditions selected. In general, the reaction is conducted for about 2 days to 1 week. At this stage, curing reaction of the prepolymer is completed. In the case that the curing reaction is not completed, properties such as abrasion resistance may be poor.

Finally, the releasable substrate is separated, and the stretchable artificial leather according to the preferred embodiment of the present invention can be obtained.

EXAMPLES

The present invention is described in more detail below by reference to Examples, but the invention is not construed as being limited to the Examples. "Parts" in the Examples are by weight. Each evaluation item was according to the following method.

Fixed Load Elongation

Fixed load elongation was measured according to the method defined in JIS L1096. Specifically, three test pieces having a width of 50 mm and a length of 250 mm were collected from a longitudinal direction, a lateral direction and a bias direction, respectively, of stretchable artificial leather or fibrous substrate. Scales at an interval of 100 mm were marked down on the central portion in a lengthwise direction of each test piece. The test piece was clamped to a tensile tester under the conditions of room temperature 20±2° C. and humidity 65±5% RH, and weight having the total weight of 8 kg including the clamping jaw was fitted to the lower part of the test piece. The test piece was allowed to stand in a state of hanging the weight for ten minutes, and distance (L) between scales was measured in the state of hanging the weight. Fixed load elongation (%) was obtained by the following formula. The result was shown by an average value.

$$\text{Fixed load elongation}(\%) = (L-100)/100 \times 100$$

Visual Quality

Car seats were prepared using the artificial leathers of the Examples and the Comparative Examples as a surface material, and the car seats were judged according to the flowing standards.

Wrinkle

Good: Wrinkles after setting up are not almost observed.
Fair: Wrinkles after setting up are slightly observed.
Poor: Wrinkles after setting up are clearly observed.

Pinhole

Good: Pinholes are not almost visible.
Fair: Pinholes are slightly visible.
Poor: Pinholes are visible.

Sitting Comfortability

Car seats were prepared using the artificial leathers of the Examples and the Comparative Examples as a surface material, and the car seats were judged according to the flowing standards.

Good: When sitting, buttocks uniformly sink down, and feeling is soft.
Fair: When sitting, buttocks uniformly sink down, but feeling is hard. Alternatively, feeling is soft, but buttocks sink down nonuniformly.
Poor: When sitting, buttocks nonuniformly sink down, and feeling is hard.

Seam Fatigue Properties

A pair of two test pieces having a width of 10 cm and a length of 10 cm was cut out either in a longitudinal direction and a lateral direction from stretchable artificial leather. Fronts faces of the two test pieces of the pair were put on each other to be overlapped, and was sewed together with a sewing machine at a position of 1 cm from an edge. Thus, longitudinal and lateral test pieces were prepared. The test piece was fitted to a seam fatigue tester (manufactured by Yamaguchi Kagaku Sangyo Co., Ltd,). A cycle of pulling and releasing was repeated 2,500 times in a manner that a load of 3 kg was applied to an end of the test piece; and maximum diameter of a hole formed by disposition of the seam, i.e. "seam fatigue" was measured at an order of 0.1 mm by using a scaled loupe in a state the load of 3 kg was continuously applied to the test piece. The seam fatigue was judged according to the following standard.

Good: Maximum value of seam fatigue is 2.0 mm or less in both a longitudinal direction and a lateral direction.
Fair: Maximum value of seam fatigue exceeds 2.0 mm and is 3.0 mm or less in both a longitudinal direction and a lateral direction.
Poor: Maximum value of seam fatigue exceeds 3.1 mm in both a longitudinal direction and a lateral direction.

BLC Value

One test piece of 150 mm square was collected, and strain measurement value (BLC value) when the test piece was pushed with a load of 500 g was measured using ST300 Leather Softness Tester (manufactured by BLC Leather Technology Center Ltd.).

Peel Strength

Three test pieces having a width of 30 mm and a length of 120 mm were collected from a longitudinal direction, a lateral direction and a bias direction, respectively, of stretchable artificial leather. A polyurethane resin layer and a fibrous substrate were peeled 40 mm from one edge of the test piece. The polyurethane resin layer and the fibrous substrate were clipped with a clamp so as not to generate sag in the atmosphere of room temperature 20±2° C. and humidity 65±5% RH. The polyurethane resin layer was peeled at a clamping width of 30 mm and movement rate of the clamp of 200 mm/min using AUTOGRAPH AG-100A (manufactured by Shimadzu Corporation). The maximum load (kg/cm) at the peeling was measured. The result is shown by an average value.

Abrasion Resistance

One test piece having a width of 70 mm and a length of 300 mm was collected from a longitudinal direction and a lateral direction of stretchable artificial leather, respectively.

Urethane foam having a width of 70 mm, a length of 300 mm and a thickness of 10 mm was fitted to the back of the test piece. Load of 9.8N was applied to a frication element covered with cotton cloth, and the test piece was abraded with the friction element. The friction element was reciprocated on the surface of the test piece 10,000 times with a distance of 140 mm at a speed of 60 reciprocations/min. The test piece after abrasion was visually observed, and judged according to the following standard.

Good: Abrasion trace cannot substantially be confirmed.
Fair: Abrasion trace can be confirmed, but fibrous substrate is not exposed.
Poor: Abrasion trace can be confirmed, and fibrous substrate is exposed.

Tensile Strength at Break

A composition was applied by means of an applicator to a smooth polyester film having a thickness of 100 μm by a dial gage method and having not been subjected to surface treatment processing such that a non-porous layer and a porous layer, having the same thickness as that of artificial leather. Thus, a polyurethane resin layer was obtained. One test piece having a width of 30 mm and a length of 150 mm was collected from the polyurethane resin layer. Both edges of the test piece were clipped with a clamp so as not to generate sag in the atmosphere of room temperature 20±2° C. and humidity 65±5%. The test piece was broken with a clamping width of 30 mm, clamping distance of 100 mm and movement rate of the clamp of 200 mm/min using AUTOGRAPH AG-100A (manufactured by Shimadzu Corporation). The maximum load (MPa) when the test piece was broken was measured.

Tensile Elongation at Break

One test piece having a width of 30 mm and a length of 150 mm was collected from the polyurethane resin layer obtained in the same manner as in the tensile strength at break. Both edges of the test piece were clipped with a clamp so as not to generate sag in the atmosphere of room temperature 20±2° C. and humidity 65±5%. The test piece was broken with a clamping width of 30 mm, clamping distance of 100 mm and movement rate of the clamp of 200 mm/min using AUTO- GRAPH AG-100A (manufactured by Shimadzu Corporation). Elongation (%) when the test piece was broken was measured.

Production of Fibrous Substrate

Production Example A1

The greige of tricot knitted fabric was obtained by knitting with two-guide bar 28 G tricot knitting machine such that the back side was made of 1-needle swing denbigh texture (1-2/1-0) by a polyester multifilament finished yarn of 56 dtex/72 f (single fiber fineness 0.78 dtex), the front side was made of 3-needle swing cord texture (1-0/3-4) by a polyester multifilament finished yarn of 56 dtex/36 f (single fiber fineness 1.56 dtex), and 85 courses/2.54 cm on the knitting machine were obtained. The greige obtained was dyed with the conventional method, and then heat-treated at 130° C. for 3 minutes with a heat setter such that the wale density on the bonded face (back side) was 1.50 times that of the greige, thereby conducting width shortening. Thus, tricot knitted fabric was obtained. The tricot knitted fabric obtained had a density of 65 courses/2.54 cm and 42 wales/2.54 cm as a result of measurement on the back side, and had the knitted loop density of $2,730/(2.54 \text{ cm})^2$. Furthermore, the tricot knitted fabric had basis weight of 179 g/m$^2$, and fixed load elongation of 41% in a longitudinal direction, 43% in a lateral direction and 41% in a bias direction.

Production Example A2

Tricot knitted fabric was obtained in the same manner as in Production Example A1, except that the greige of the tricot knitted fabric was subjected to width shortening such that wale density of the bonded face (back side) was 1.61 times that of the greige. The tricot knitted fabric obtained had a density of 68 courses/2.54 cm and 45 wales/2.54 cm as a result of measurement on the back side, and had the knitted loop density of $3,060/(2.54 \text{ cm})^2$. Furthermore, the tricot knitted fabric had basis weight of 198 g/m$^2$, and fixed load elongation of 45% in a longitudinal direction, 53% in a lateral direction and 52% in a bias direction.

Production Example A3

Tricot knitted fabric was obtained in the same manner as in Production Example A1, except that the greige of the tricot knitted fabric was subjected to width shortening such that wale density of the bonded face (back side) was 1.71 times that of the greige. The tricot knitted fabric obtained had a density of 72 courses/2.54 cm and 48 wales/2.54 cm as a result of measurement on the back side, and had the knitted loop density of $3,456/(2.54 \text{ cm})^2$. Furthermore, the tricot knitted fabric had basis weight of 241 g/m$^2$, and fixed load elongation of 54% in a longitudinal direction, 68% in a lateral direction and 61% in a bias direction.

Production Example A4

The greige of tricot knitted fabric was obtained by knitting with two-guide bar 28 G tricot knitting machine such that the back side was made of 1-needle swing denbigh texture (1-2/1-0) by a polyester multifilament finished yarn of 110 dtex/36 f (single fiber fineness 3.06 dtex), the front side was made of 5-needle swing cord texture (1-0/5-6) by a polyester multifilament finished yarn of 110 dtex/36 f (single fiber fineness 3.06 dtex), and 82 courses/2.54 cm on the knitting machine were obtained. The greige obtained was dyed with the conventional method, and then heat-treated at 130° C. for 3 minutes with a heat setter such that the wale density on the bonded face (back side) was 1.57 times that of the greige, thereby conducting width shortening. Thus, tricot knitted fabric was obtained. The tricot knitted fabric obtained had a density of 73 courses/2.54 cm and 44 wales/2.54 cm as a result of measurement on the back side, and had the knitted loop density of $3,212/(2.54 \text{ cm})^2$. Furthermore, the tricot knitted fabric had basis weight of 275 g/m$^2$, and fixed load elongation of 41% in a longitudinal direction, 54% in a lateral direction and 51% in a bias direction.

Production Example A5

Tricot knitted fabric was obtained in the same manner as in Production Example A1, except that the greige of the tricot knitted fabric was subjected to width shortening such that wale density of the bonded face (back side) was 1.36 times that of the greige. The tricot knitted fabric obtained had a density of 62 courses/2.54 cm and 38 wales/2.54 cm as a result of measurement on the back side, and had the knitted loop density of $2,356/(2.54 \text{ cm})^2$. Furthermore, the tricot knitted fabric had basis weight of 151 g/m$^2$, and fixed load elongation of 31% in a longitudinal direction, 32% in a lateral direction and 30% in a bias direction.

Production Example A6

Tricot knitted fabric was obtained in the same manner as in Production Example A1, except that the greige of the tricot knitted fabric was subjected to width shortening such that wale density of the bonded face (back side) was 1.79 times that of the greige. The tricot knitted fabric obtained had a density of 74 courses/2.54 cm and 50 wales/2.54 cm as a result of measurement on the back side, and had the knitted loop density of $3,700/(2.54 \text{ cm})^2$. Furthermore, the tricot knitted fabric had basis weight of 259 g/m$^2$, and fixed load elongation of 75% in a longitudinal direction, 80% in a lateral direction and 77% in a bias direction.

Production Example A7

Tricot knitted fabric was obtained in the same manner as in Production Example A1, except that the greige of the tricot knitted fabric was subjected to width shortening such that wale density of the bonded face (back side) was 1.21 times that of the greige. The tricot knitted fabric obtained had a density of 84 courses/2.54 cm and 34 wales/2.54 cm as a result of measurement on the back side, and had the knitted loop density of $2,856/(2.54 \text{ cm})^2$. Furthermore, the tricot knitted fabric had basis weight of 185 g/m$^2$, and fixed load elongation of 77% in a longitudinal direction, 20% in a lateral direction and 35% in a bias direction.

Production Example A8

The greige of circular knitting fabric was obtained by knitting with 22 G circular knitting machine such that the back side was made of polyester multifilament finished yarn of 84 dtex/72 f (single fiber fineness 1.17 dtex) and the front side was made of polyester multifilament finished yarn of 110 dtex/48 f (single fiber fineness 2.29 dtex), thereby forming brush texture. The greige obtained was dyed with the conventional method, and then heat-treated at 130° C. for 3 minutes with a heat setter. Thus, circular knitted fabric was obtained. The circular knitted fabric obtained had a density of 36 courses/2.54 cm and 36 wales/2.54 cm, and had the knitted loop density of 1,296/(2.54 cm)². The circular knitted fabric had basis weight of 292 g/m², and fixed load elongation of 66% in a longitudinal direction, 63% in a lateral direction and 42% in a bias direction.

Production of Hot-Melt Urethane Polyisocyanate Prepolymer

Production Example B1

10 parts of a polyester polyol (KURARAY POLYOL P3010, manufactured by Kuraray Co., Ltd.) having a number average molecular weight of 3,000, and 2 parts of 4,4'-diphenylmethane diisocyanate (MDI) were placed in a 1 liter four-necked flask maintained at 60° C., and the resulting mixture was stirred at 80° C. until hydroxyl groups were consumed (equivalent ratio (isocyanate group/hydroxyl group) is 2.4). Thus, a hot-melt urethane polyisocyanate prepolymer (softening temperature: 60° C., number average molecular weight: 25,000) was obtained.

Production Example B2

10 parts of a polycarbonate polyol (KURARAY POLYOL C2050, manufactured by Kuraray Co., Ltd.) having a number average molecular weight of 2,000, and 3 parts of 4,4'-diphenylmethane diisocyanate (MDI) were placed in a 1 liter four-necked flask maintained at 60° C., and the resulting mixture was stirred at 80° C. until hydroxyl groups were consumed (equivalent ratio (isocyanate group/hydroxyl group) is 2.4). Thus, a hot-melt urethane polyisocyanate prepolymer (softening temperature: 50° C., number average molecular weight: 18,000) was obtained.

Example 1

Formulation 1

| | |
|---|---|
| Polycarbonate type Polyurethane resin (CRYSBON NY-328, manufactured by DIC Corporation) | 100 parts |
| DMF | 40 parts |
| Carbon black pigment (DIALAC BLACK L-1770S, manufactured by DIC Corporation) | 15 parts |
| Crosslinking agent (BARNOCK DN950, manufactured by DIC Corporation) | 2 parts |
| Viscosity was adjusted to 2,000 cps. | |

Formulation 2

| | |
|---|---|
| Hot-melt urethane polyisocyanate prepolymer of Production Example B1 (heat-melted to 100° C.) | 100 parts |
| Urethane hardener (polyester polyol having a number average molecular weight of 2,000, heat-melted to 40° C. (KURARAY POLYOL P-2050, manufactured by Kuraray Co., Ltd.)) | 15 parts |
| Carbon black pigment (POLYTON BLACK, manufactured by DIC Corporation) | 2 parts |
| Amine type urethanation catalyst (TOYOCAT-DT, manufactured by Tosoh Corporation) | 1 part |
| Organic phosphinate type flame retardant (aluminum diethylphosphinate, average particle diameter: 4 μm) | 10 parts |

The polyurethane resin composition prepared according to Formulation 1 above was applied to a release paper having grain pattern (R-51, manufactured by Lintec Corporation) with a comma coater in a sheet form such that an application thickness was 200 μm. Thus obtained laminate was heat-treated at 100° C. for 2 minutes with a drier. Thus, a non-porous layer having a thickness of 40 μm was formed.

The prepolymer composition prepared according to Formulation 2 above was applied to the surface of the non-porous layer formed on the release paper with a comma coater in a sheet form such that an application thickness was 150 μm. The coated surface was bonded to a back side of the tricot knitted fabric of Production Example A1 in a state that the prepolymer composition had viscosity. The resulting laminate was pressed under a load of 5 kg/m² with a mangle, and was then subjected to an aging treatment under the atmosphere at a temperature of 23° C. and a relative humidity of 65% for 3 days, thereby forming a porous layer having a thickness of 180 μm. The release paper was separated from the laminate. Thus, a stretchable artificial leather of Example 1 was obtained.

The polyurethane resin layer of the stretchable artificial leather obtained had dry application amount of 200 g/m², tensile strength at break of 6.3 MPa and tensile elongation at break of 128%. The evaluation of the stretchable artificial leather is shown in Table 1.

Example 2

Stretchable artificial leather of Example 2 was obtained in the same manner as in Example 1, except for using the tricot knitted fabric of Production Example A2 as a fibrous substrate. The evaluation of the stretchable artificial leather obtained is shown in Table 1.

Example 3

Stretchable artificial leather of Example 3 was obtained in the same manner as in Example 1, except for using the tricot knitted fabric of Production Example A3 as a fibrous substrate. The evaluation of the stretchable artificial leather obtained is shown in Table 1.

Example 4

Stretchable artificial leather of Example 4 was obtained in the same manner as in Example 2, except that the application thickness of the prepolymer composition prepared according to Formulation 2 above was 100 μm and the thickness of the porous layer was 120 μm. The polyurethane resin layer of the stretchable artificial leather obtained had dry application amount of 150 g/m², tensile strength at break of 7.4 MPa and tensile elongation at break of 146%. The evaluation of the stretchable artificial leather is shown in Table 1.

Example 5

Stretchable artificial leather of Example 5 was obtained in the same manner as in Example 2, except that the application thickness of the prepolymer composition prepared according to Formulation 2 above was 250 μm and the thickness of the porous layer was 300 μm. The polyurethane resin layer of the stretchable artificial leather obtained had dry application amount of 300 g/m², tensile strength at break of 5.2 MPa and tensile elongation at break of 115%. The evaluation of the stretchable artificial leather is shown in Table 1.

Example 6

Stretchable artificial leather of Example 6 was obtained in the same manner as in Example 1, except for using the tricot knitted fabric of Production Example A4 as a fibrous substrate. The evaluation of the stretchable artificial leather obtained is shown in Table 1.

Example 7

Stretchable artificial leather of Example 7 was obtained in the same manner as in Example 1, except that the tricot knitted fabric of Production Example A1 was used as a fibrous substrate and the coated surface was bonded to the front side of the tricot knitted fabric. The evaluation of the stretchable artificial leather is shown in Table 1.

Example 8

Formulation 3

| | |
|---|---|
| Hot-melt urethane polyisocyanate prepolymer of Production Example B2 (heat-melted to 100° C.) | 100 parts |
| Urethane hardener (polyester polyol having a number average molecular weight of 2,000, heat-melted to 40° C. (KURARAY POLYOL P-2050, manufactured by Kuraray Co., Ltd.)) | 15 parts |
| Carbon black pigment (POLYTON BLACK, manufactured by DIC Corporation) | 2 parts |
| Amine type urethanation catalyst (TOYOCAT-DT, manufactured by Tosoh Corporation) | 1 part |
| Organic phosphinate type flame retardant (aluminum diethylphosphinate, average particle diameter: 4 μm) | 10 parts |

Stretchable artificial leather of Example 8 was obtained in the same manner as in Example 1, except for using the prepolymer composition prepared according to Formulation 3 above. The polyurethane resin layer of the stretchable artificial leather obtained had dry application amount of 200 g/m$^2$, tensile strength at break of 8.1 MPa and tensile elongation at break of 107%. The evaluation of the stretchable artificial leather obtained is shown in Table 1.

Comparative Example 1

Artificial leather of Comparative Example 1 was obtained in the same manner as in Example 1, except for using the tricot knitted fabric of Production Example A5 as a fibrous substrate. The evaluation of the stretchable artificial leather obtained is shown in Table 1.

Comparative Example 2

Artificial leather of Comparative Example 2 was obtained in the same manner as in Example 1, except for using the tricot knitted fabric of Production Example A6 as a fibrous substrate. The evaluation of the stretchable artificial leather obtained is shown in Table 1.

Comparative Example 3

Artificial leather of Comparative Example 3 was obtained in the same manner as in Example 1, except for using the tricot knitted fabric of Production Example A7 as a fibrous substrate. The evaluation of the stretchable artificial leather obtained is shown in Table 1.

Comparative Example 4

Artificial leather of Comparative Example 4 was obtained in the same manner as in Example 1, except for using the circular knitted fabric of Production Example A8 as a fibrous substrate. The evaluation of the stretchable artificial leather obtained is shown in Table 1.

As shown in Table 1, the Examples in which the tricot knitted fabric is used as a fibrous substrate, and fixed load elongation in a longitudinal direction, a lateral direction and a bias direction is set to a predetermined range are that wrinkles are difficult to be generated and pinholes are not visible when setting up, visual quality is good, and seam fatigue properties and sitting comfortability are good, even in the case of using the stretchable artificial leather in car seats having complicated three-dimensional shape. On the other hand, Comparative Example 1 in which the tricot knitted fabric is used, but fixed load elongation is small is that wrinkles are generated when setting up, and sitting comfortability is poor. Comparative Example 2 in which the tricot knitted fabric is used, but fixed load elongation is large is that pinholes are visible when setting up, and seam fatigue properties are poor. Comparative Example 3 in which the tricot knitted fabric is used, but fixed load elongation is large in a longitudinal direction and small in a lateral direction is that visual quality is poor in the points of wrinkles and pinholes when setting up, and sitting comfortability is poor. Comparative Example 4 in which circular knitting fabric is used is that pinholes are visible when setting up, resulting in deterioration of visual quality, and seam fatigue properties are poor.

TABLE 1

| | | | Example 1 | Example 2 | Example 3 | Example 4 | Example 5 | Example 6 | Example 7 |
|---|---|---|---|---|---|---|---|---|---|
| Artificial leather | Fixed load elongation (%) (Longitudinal/lateral/bias) | | 34/37/36 | 41/45/44 | 51/60/60 | 43/47/46 | 40/42/41 | 37/49/45 | 38/40/39 |
| | Seam fatigue properties (longitudinal/lateral) | | Good/Good | Good/Good | Good/Good | Good/Good | Good/Good | Good/Good | Good/Good |
| | Peel strength (kg/cm) | | 1.8 | 1.7 | 1.6 | 1.5 | 2.0 | 0.9 | 1.3 |
| | BLC value | | 4.5 | 5.0 | 5.5 | 5.3 | 3.0 | 4.2 | 4.8 |
| | Abrasion resistance | | Good | Good | Good | Fair | Good | Fair | Good |
| | Sitting comfortability | | Good | Good | Good | Good | Good | Good | Good |
| | Visual quality (wrinkle/pinhole) | | Good/Good | Good/Good | Good/Good | Good/Good | Good/Good | Good/Good | Good/Good |
| | Weight ratio (resin/fiber) | | 1.1 | 1.0 | 0.8 | 0.8 | 1.5 | 0.7 | 1.1 |
| Fibrous substrate | Kind | | Tricot | Tricot | Tricot | Tricot | Tricot | Tricot | Tricot |
| | Texture | Back side | Denbigh | Denbigh | Denbigh | Denbigh | Denbigh | Denbigh | Denbigh |
| | | Front side | Cord (3 needles) | Cord (3 needles) | Cord (3 needles) | Cord (3 needles) | Cord (3 needles) | Cord (5 needles) | Cord (3 needles) |

TABLE 1-continued

|  |  |  |  |  |  |  |  |  |  |
|---|---|---|---|---|---|---|---|---|---|
|  | Yarn used | Back side | 56t/72f | 56t/72f | 56t/72f | 56t/72f | 56t/72f | 110t/36f | 56t/72f |
|  |  | Front side | 56t/36f | 56t/36f | 56t/36f | 56t/36f | 56t/36f | 110t/36f | 56t/36f |
|  | Fixed load elongation (%) (longitudinal/lateral/bias) |  | 41/43/41 | 45/53/52 | 54/68/61 | 45/53/52 | 45/53/52 | 41/54/51 | 41/43/41 |
|  | Course density/wale density |  | 65/42 | 68/45 | 72/48 | 68/45 | 68/45 | 73/44 | 65/42 |
|  | Knitted loop density (number/ (2.54 cm)$^2$) |  | 2730 | 3060 | 3456 | 3060 | 3060 | 3212 | 2730 |
|  | Basis weight (g/m$^2$) |  | 179 | 198 | 241 | 198 | 198 | 275 | 179 |
|  | Ratio of increasing wale density by width shortening |  | 1.50 | 1.61 | 1.71 | 1.61 | 1.61 | 1.57 | 1.50 |
| Polyurethane resin layer | Dry application amount (g/m$^2$) |  | 200 | 200 | 200 | 150 | 300 | 200 | 200 |
|  | Tensile strength at break (MPa) |  | 6.3 | 6.3 | 6.3 | 7.4 | 5.2 | 6.3 | 6.3 |
|  | Tensile elongation at break (%) |  | 128 | 128 | 128 | 146 | 115 | 128 | 128 |

|  |  |  | Example 8 | Comparative Example 1 | Comparative Example 2 | Comparative Example 3 | Comparative Example 4 |
|---|---|---|---|---|---|---|---|
| Artificial leather | Fixed load elongation (%) (Longitudinal/lateral/bias) |  | 32/35/34 | 22/24/23 | 73/77/75 | 70/15/31 | 58/57/50 |
|  | Seam fatigue properties (longitudinal/lateral) |  | Good/Good | Good/Good | Fair/Poor | Good/Good | Poor/Poor |
|  | Peel strength (kg/cm) |  | 2.5 | 1.9 | 1.5 | 1.7 | 1.3 |
|  | BLC value |  | 4.1 | 3.0 | 5.0 | 3.1 | 5.5 |
|  | Abrasion resistance |  | Good | Good | Fair | Good | Fair |
|  | Sitting comfortability |  | Good | Poor | Fair | Poor | Good |
|  | Visual quality (wrinkle/pinhole) |  | Good/Good | Poor/Good | Fair/Poor | Poor/Fair | Fair/Poor |
|  | Weight ratio (resin/fiber) |  | 1.1 | 1.3 | 0.8 | 1.1 | 0.7 |
| Fibrous substrate | Kind |  | Tricot | Tricot | Tricot | Tricot | Circular knitting |
|  | Texture | Back side | Denbigh | Denbigh | Denbigh | Denbigh | Brush |
|  |  | Front side | Cord (3 needles) | Cord (3 needles) | Cord (3 needles) | Cord (3 needles) | — |
|  | Yarn used | Back side | 56t/72f | 56t/72f | 56t/72f | 56t/72f | 84t/72f |
|  |  | Front side | 56t/36f | 56t/36f | 56t/36f | 56t/36f | 110t/48f |
|  | Fixed load elongation (%) (longitudinal/lateral/bias) |  | 41/43/41 | 31/32/30 | 75/80/77 | 77/20/35 | 66/63/42 |
|  | Course density/wale density |  | 65/42 | 62/38 | 74/50 | 84/34 | 36/36 |
|  | Knitted loop density (number/ (2.54 cm)$^2$) |  | 2730 | 2356 | 3700 | 2856 | 1296 |
|  | Basis weight (g/m$^2$) |  | 179 | 151 | 259 | 185 | 292 |
|  | Ratio of increasing wale density by width shortening |  | 1.50 | 1.36 | 1.79 | 1.21 | — |
| Polyurethane resin layer | Dry application amount (g/m$^2$) |  | 200 | 200 | 200 | 200 | 200 |
|  | Tensile strength at break (MPa) |  | 8.1 | 6.3 | 6.3 | 6.3 | 6.3 |
|  | Tensile elongation at break (%) |  | 107 | 128 | 128 | 128 | 128 |

What is claimed is:

1. Stretchable artificial leather comprising a fibrous substrate comprising tricot knitted fabric having a multi-layer knitted texture and a knitted loop density of from 1,000 to 5,000/(2.54 cm)$^2$, the tricot knitted fabric further having a back side of a 1 needle swing denbigh texture and a front side of a 2 to 6-needle swing cord texture, and a polyurethane resin layer laminated on a surface of the fibrous substrate, the stretchable artificial leather having fixed load elongation of from 30 to 60% in each of a longitudinal direction, a lateral direction and a bias direction.

2. The stretchable artificial leather according to claim 1, having a BLC value of from 3.0 to 6.5.

3. The stretchable artificial leather according to claim 1, having peel strength of 0.5 kg/cm or more.

4. The stretchable artificial leather according to claim 1, wherein the tricot knit fabric has fixed load elongation of from 40 to 70% in each of a longitudinal direction, a lateral direction and a bias direction.

5. The stretchable artificial leather according to claim 1, wherein a weight ratio of the polyurethane resin layer to the fibrous substrate (polyurethane resin layer/fibrous substrate) is from 0.375/1 to 3.0/1.

6. The stretchable artificial leather according to claim 1, wherein the polyurethane resin layer is laminated on a face of the denbigh texture among front and back knitted textures of the tricot knitted fabric.

7. The stretchable artificial leather according to claim 1, wherein the polyurethane resin layer is laminated on a face of the cord texture among front and back knitted textures of the tricot knitted fabric.

8. The stretchable artificial leather according to claim 1, wherein the tricot knitted fabric has a ratio between course density and wale density (course density/wale density) of from 1.0/1 to 2.0/1.

9. The stretchable artificial leather according to claim 1, wherein the polyurethane resin layer comprises a porous layer formed on the fibrous substrate, and a non-porous layer formed on the porous layer.

10. The stretchable artificial leather according to claim 9, wherein the porous layer comprises a moisture-curable polyurethane resin comprising a hot-melt urethane polyisocyanate prepolymer.

* * * * *